Nov. 26, 1968  C. R. KILLIAN  3,412,962
RETRACTABLE AIR DRAG REDUCING AIRCRAFT ATTACHMENT
Filed April 10, 1967
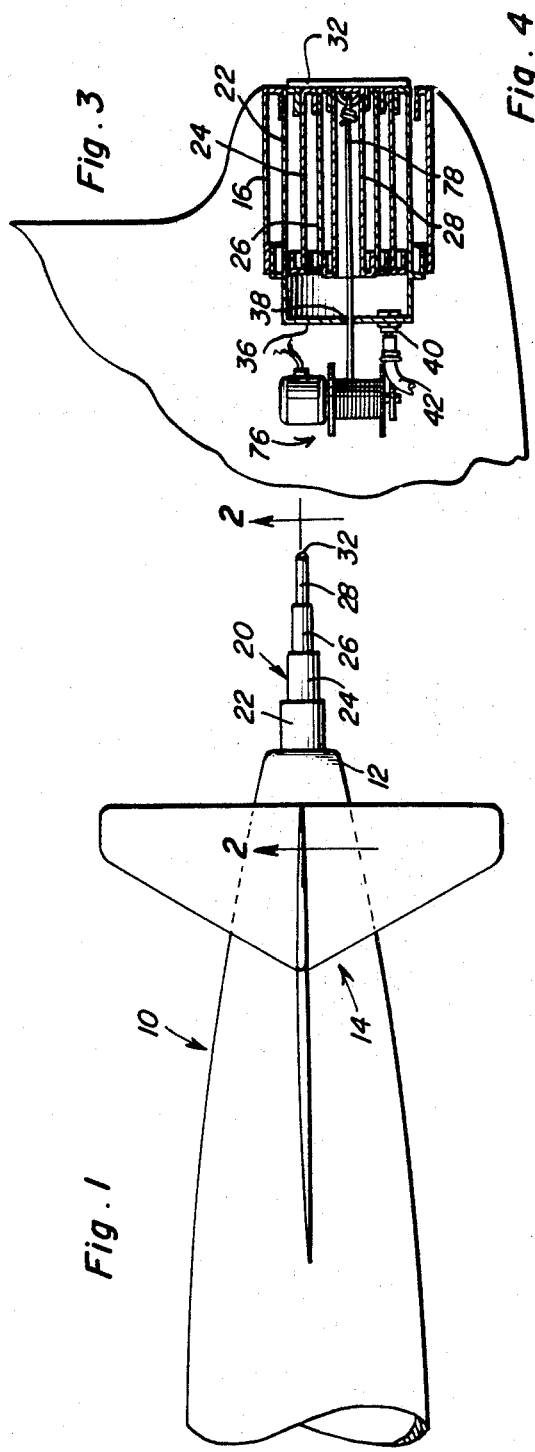
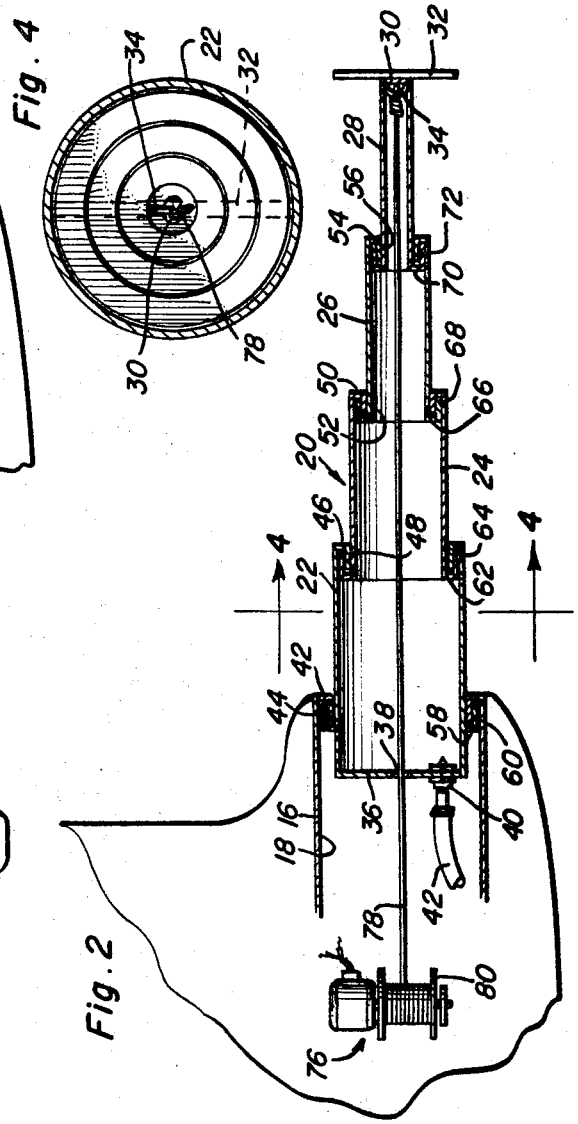
Claud R. Killian
INVENTOR.
BY Clarence A. O'Brien
and Harvey B. Jacobson
Attorneys

United States Patent Office 3,412,962
Patented Nov. 26, 1968

3,412,962
RETRACTABLE AIR DRAG REDUCING
AIRCRAFT ATTACHMENT
Claud R. Killian, R.F.D. 2, Hayesville, N.C. 28904
Filed Apr. 10, 1967, Ser. No. 629,676
8 Claims. (Cl. 244—130)

ABSTRACT OF THE DISCLOSURE

An air drag reducing attachment for the blunt rearward end of an aircraft body portion and including a plurality of elongated concentrically nested and relatively, telescopingly engaged tubular members with each smaller member being rearwardly extendible relative to the next largest member so as to form a tapering rear end portion for the aircraft body portion with which the attachment is operatively associated.

---

The retractable air drag reducing attachment of the instant invention has been specifically designed to provide a means whereby the blunt rearward end of an aircraft body portion may be streamlined during high speed flight and yet free of extensive length for the purpose of streamlining while the associated aircraft is on the ground in a crowded air terminal.

Of course, an airplane fuselage generally cylindrical in configuration and provided with extremely blunt or flat end portions would provide maximum interior space without increasing cross-sectional area and length. However, the blunt or flat front and rear ends of such a fuselage would offer great resistance to movement of such a fuselage through the air at high speeds. Accordingly, the front or nose end of aircraft fuselages are conventionally somewhat pointed and rounded so as to reduce the air drag at the forward ends thereof. However, the rear ends of aircraft fuselages are vertically and transversely tapered rearwardly so as to reduce the air drag thereon and thus the interior volume of the rear end of the aircraft fuselages is appreciably reduced. Of course, this tapering is not carried out to an extreme and therefore the extreme rear end portion is at least somewhat blunt. It would of course be possible to further streamline these blunt ends but such streamlining would unnecessarily extend the length of the fuselages behind the tail structures thereof and would appreciably increase the length thereof without providing usable internal space. Therefore, the main object of this invention is to provide an air drag reducing attachment for the rear ends of aircraft body portions which may be extended rearwardly when the aircraft is in flight and define a tapering rearward extension of the body portion and yet which may be fully retracted into the blunt end of the aircraft body portion when the aircraft is on the ground.

A further object of this invention is to provide an extendable air drag reducing attachment in accordance with the preceding object and constructed in a manner whereby it may be readily extended and retracted.

Yet another object of this invention is to provide an attachment in accordance with the preceding objects and which will not add appreciable weight to the rear end portion of an associated airplane fuselage.

A final object of this invention to be specifically enumerated herein is to provide an attachment in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the rear portion of an airplane fuselage shown with the attachment of the instant invention operatively associated therewith and in a fully extended position;

FIGURE 2 is an enlarged fragmentary longitudinal vertical sectional view taken substantially upon the plane indicated by section line 2—2 of FIGURE 1;

FIGURE 3 is a view similar to FIGURE 2 but with the attachment illustrated in a fully retracted position; and FIGURE 4 is a transverse sectional view taken substantially upon a plane indicated by the section line 4—4 of FIGURE 2.

Referring now more specifically to the drawings the numeral 10 generally designates an airplane fuselage including a blunt rear end portion 12 forwardly of which a tail assembly generally referred to by the reference numeral 14 is disposed. The blunt end portion 12 includes structural means 16 defining a rearwardly opening recess 18 and the air drag reducing attachment of the instant invention generally referred to by the reference numeral 20.

The attachment 20 includes a plurality of nested generally cylindrical and hollow members 22, 24, 26 and 28 which are progressively reduced in diameter. The smallest hollow member 28 includes a rear wall 30 from whose outer surface an upstanding abutment rod 32 is supported and from whose inner surface an anchor assembly 34 is supported. The forward end of the largest member 22 includes a front wall 36 centrally apertured as at 38 and the discharge end 40 of a compressed air line 42 opens into the interior of the largest member 22 through the front wall 36 thereof.

The structural member 16 includes annular and cylindrical flange portions 42 and 44 at its rear end while the hollow members 22, 24 and 26 include similar flanges 46 and 48, 50 and 52, and 54 and 56. In addition, the forward ends of the members 22, 24, 26 and 28 include annular and cylindrical flange portions 58 and 60, 62 and 64, 66 and 68, and 70 and 72.

From FIGURE 2 of the drawings it may be seen that the flanges 58 and 60 abut the flanges 44 and 42, the flanges 62 and 64 abut the flanges 48 and 46, the flanges 66 and 68 abut the flanges 52 and 50, and the flanges 70 and 72 abut the flanges 56 and 54 to limit rearward extension of the sections or hollow members 22, 24, 26 and 28 and angular displacement thereof relative to the longitudinal centerlines of the recess 18 defined by the structural means 16 and the next largest hollow members when the hollow members are in their fully extended positions.

Inasmuch as the flanges 64, 68 and 72 are reasonably tightly received within the members 22, 24 and 26, air introduced into the interior of the section 22 through the line 42 will affect extension of the attachment 20. Of course there is a reasonable amount of air drag on the abutment rod 32 and thus the section 22 may be extended rearwardly of the recess 18 by the rearward pull of air drag on the abutment rod 32.

The fuselage 10 has mounted therein a motorized winch assembly generally referred to by the reference numeral 76 and includes an elongated flexible tension member 78 partially wound on the winding drum portion 80 thereof. The free end of the elongated tension member 78 is secured to the anchor assembly 34 and thus may be utilized to retract the section or member 28 into the section 26 whereupon the abutment rod 32 will engage the flange 54 and further forward movement of the member 28 by the motorized winch assembly 76 will successively cause the abutment rod 32 to abut the flanges 50 and 46 and thus fully retract the attachment 20 to the position thereof illustrated in FIGURE 3 of the drawings.

From FIGURES 1 and 2 of the drawings it may be seen that the attachment 20 comprises a streamlined rearward extension of the blunt end portion 12 and therefore that the attachment 20 may be utilized to reduce air drag while the fuselage 10 is moving forwardly through the air at high speed. Of course, the members 22, 24, 26 and 28 could be truncated cone-shaped in configuration as opposed to cylindrical and the hose or conduit 42 may either be operatively connected to a source of air under pressure such as an engine compressor or merely subjected to ram air pressure from some forwardly facing portion of the associated aircraft.

What is claimed as new is as follows:

1. In combination with an aircraft of the type including a body portion terminating rearwardly in a blunt end portion, a retractable air drag reducing assembly carried by said blunt end portion and including a plurality of nested generally concentric hollow members similar in cross sectional shape, said blunt end portion including means defining a rearwardly opening recess, said outermost hollow member and the members disposed therein including rear end portions extendable rearwardly from and retractable relative to said recess and the next largest hollow members, respectively, said hollow members, when extended, defining a gradually rearwardly tapering air drag reducing extension of said blunt end portion, and means operatively connected between said body portion and said hollow members and operable to shift said hollow members from rearwardly displaced extended positions toward positions retracted in said recess and the next largest hollow members.

2. The combination of claim 1 wherein the portions of said means defining the rear end of said recess and the rear ends of said hollow members larger than the smallest hollow member include means coacting with the forward ends of said hollow members to limit rearward extension of said hollow members.

3. The combination of claim 2 wherein the last mentioned means includes means operative to resist angular displacement of said hollow members relative to the longitudinal center lines of said recess and the next largest hollow member when said hollow members are in their fully extended positions.

4. In combination with an aircraft of the type including a body portion terminating rearwardly in a blunt end portion, a retractable air drag reducing assembly carried by said blunt end portion and including a plurality of nested generally concentric hollow members similar in cross sectional shape, said blunt end portion including a rearwardly opening recess, said outermost hollow member and the members disposed therein including rear end portions extendable rearwardly from and retractable relative to said recess and the next largest hollow members, respectively, said hollow members, when extended, defining a gradually rearwardly tapering air drag reducing extension of said blunt end portion, means operatively connected to the smallest of said hollow members for forwardly displacing the latter into said recess, said smallest member including abutment means carried by its rear end portion engageable with the rear end portions of each of the larger hollow members for urging the latter toward said recess in response to movement of said smallest member thereinto.

5. The combination of claim 1 wherein said hollow members are generally cylindrical in configuration.

6. The combination of claim 1 wherein said body portion comprises an airplane fuselage.

7. The combination of claim 4 wherein the portions of said body portion defining the rear end of said recess and the rear ends of said hollow members larger than the smallest hollow member include means coacting with the forward ends of said hollow members to limit rearward extension of said hollow members, the last mentioned means including outwardly projecting circumferentially extending flange means carried by the forward ends of said hollow members and inwardly projecting circumferentially extending flange means carried by the portions of said body portion defining the rear portion of said recess and the rear ends of the hollow members larger than the smallest hollow member abuttingly engageable with the first mentioned flange means.

8. The combination of claim 7 wherein said hollow members are generally cylindrical in configuration.

References Cited

UNITED STATES PATENTS

| | | | |
|---|---|---|---|
| 229,499 | 6/1880 | Turner | 244—3.3 |
| 1,817,377 | 8/1931 | James | 244—3.3 |

MILTON BUCHLER, *Primary Examiner.*

J. PITTENGER, *Assistant Examiner.*